United States Patent
Barriga et al.

(10) Patent No.: US 11,022,384 B2
(45) Date of Patent: Jun. 1, 2021

(54) FRAMED HEAT EXCHANGER CORE DESIGN-FABRICATION

(71) Applicant: HONEYWELL INTERNATIONAL INC., Morris Plains, NJ (US)

(72) Inventors: Jorge Barriga, Mexicali (MX); Javier Pina, Ensenada (MX); Ahuizotl Arellano, Mexicalo (MX)

(73) Assignee: Honeywell International Inc., Charlotte, NC (US)

(*) Notice: Subject to any disclaimer, the term of this patent is extended or adjusted under 35 U.S.C. 154(b) by 215 days.

(21) Appl. No.: 15/899,362

(22) Filed: Feb. 19, 2018

(65) Prior Publication Data

US 2019/0257595 A1    Aug. 22, 2019

(51) Int. Cl.
| | |
|---|---|
| *F28F 3/08* | (2006.01) |
| *F28F 3/02* | (2006.01) |
| *B23K 1/00* | (2006.01) |
| *F28D 9/00* | (2006.01) |
| *F28F 3/04* | (2006.01) |

(52) U.S. Cl.
CPC ............ *F28F 3/086* (2013.01); *B23K 1/0012* (2013.01); *F28D 9/0075* (2013.01); *F28F 3/027* (2013.01); *F28F 3/048* (2013.01); *F28F 2275/04* (2013.01)

(58) Field of Classification Search
CPC ...... F28F 3/02; F28F 3/027; F28F 3/04; F28F 3/048; F28F 3/086; F28F 9/001; F28F 2275/04; F28F 2275/06; F28D 9/0062; F28D 9/0075; B23K 1/0012; B23K 2101/14

USPC ................. 165/164, 165, 166; 126/651, 689
See application file for complete search history.

(56) References Cited

U.S. PATENT DOCUMENTS

| | | | | |
|---|---|---|---|---|
| 2,368,814 A | * | 2/1945 | Fagan | F28D 9/0037 165/166 |
| 2,961,222 A | * | 11/1960 | Butt | F28D 9/0037 165/166 |
| 3,247,899 A | * | 4/1966 | Branch | F28D 9/0062 165/166 |
| 3,262,496 A | * | 7/1966 | Bawabe | F28D 9/0068 165/166 |
| 4,301,863 A | * | 11/1981 | Bizzarro | F28D 9/0062 165/166 |
| 4,442,886 A | * | 4/1984 | Dinulescu | F28D 9/0037 165/76 |

(Continued)

FOREIGN PATENT DOCUMENTS

| | | |
|---|---|---|
| DE | 102009035676 A1 | 2/2011 |
| EP | 0117565 a2 | 2/1984 |

(Continued)

OTHER PUBLICATIONS

Response to Office Action dated Mar. 30, 2020, from U.S. Appl. No. 16/182,374, filed Jun. 30, 2020, 8 pp.

(Continued)

*Primary Examiner* — Len Tran
*Assistant Examiner* — Gustavo A Hincapie Serna
(74) *Attorney, Agent, or Firm* — Shumaker & Sieffert, P.A.

(57) ABSTRACT

A heat exchanger core includes a first fin passage. A first frame surrounds a perimeter of the first fin passage. The first frame includes a plurality of bars configured to be removable from the first frame.

11 Claims, 7 Drawing Sheets

(56) References Cited

U.S. PATENT DOCUMENTS

| | | | | |
|---|---|---|---|---|
| 4,478,277 A | * | 10/1984 | Friedman | F28F 3/025 |
| | | | | 165/170 |
| 4,688,629 A | | 8/1987 | Kohnken | |
| 5,183,106 A | * | 2/1993 | Stancliffe | F28F 3/025 |
| | | | | 165/166 |
| 5,681,538 A | * | 10/1997 | Sung | B01J 19/249 |
| | | | | 165/166 |
| 6,267,176 B1 | * | 7/2001 | Bolla | F28D 9/0062 |
| | | | | 165/166 |
| 6,883,502 B2 | * | 4/2005 | Nechvatal | F02B 29/0462 |
| | | | | 123/563 |
| 6,962,194 B2 | | 11/2005 | Martin et al. | |
| 8,955,578 B2 | * | 2/2015 | Kwon | F24F 12/006 |
| | | | | 165/76 |
| 9,273,907 B2 | * | 3/2016 | Dinulescu | F28F 9/001 |
| 9,671,168 B2 | | 6/2017 | Glück | |
| 9,797,350 B2 | * | 10/2017 | Jasper | B23P 15/26 |
| 10,175,007 B2 | * | 1/2019 | Wang | F28D 9/0037 |
| 2002/0038703 A1 | | 4/2002 | Maeda et al. | |
| 2008/0202724 A1 | | 8/2008 | Lorenz et al. | |
| 2008/0236802 A1 | | 10/2008 | Koepke | |
| 2009/0101321 A1 | * | 4/2009 | Ostersetzer | F28F 3/025 |
| | | | | 165/164 |
| 2009/0266104 A1 | | 10/2009 | Ichiyanagi | |
| 2012/0000633 A1 | * | 1/2012 | Malugani | F28F 3/08 |
| | | | | 165/157 |
| 2014/0231054 A1 | | 8/2014 | Martins | |
| 2015/0298267 A1 | * | 10/2015 | Rigal | B23K 26/24 |
| | | | | 165/164 |
| 2019/0049187 A1 | * | 2/2019 | Zeidner | F28D 9/0062 |
| 2019/0101339 A1 | * | 4/2019 | Ling | F28D 9/0025 |
| 2019/0310026 A1 | * | 10/2019 | Chopard | F28D 9/0062 |
| 2020/0141655 A1 | | 5/2020 | Friestad, Jr. et al. | |

FOREIGN PATENT DOCUMENTS

| | | | | |
|---|---|---|---|---|
| EP | 2597412 A1 | | 5/2013 | |
| EP | 3306207 A1 | | 4/2018 | |
| GB | 838466 A | * | 6/1960 | F28F 9/001 |
| GB | 838466 A | | 6/1960 | |
| JP | 2006322641 A | | 11/2006 | |
| WO | 2014116172 A1 | | 7/2014 | |

OTHER PUBLICATIONS

Notice of Allowance from U.S. Appl. No. 16/182,374, dated Jul. 16, 2020, 5 pp.

Office Action from U.S. Appl. No. 16/182,374, dated Mar. 30, 2020, 5 pp.

U.S. Appl. No. 16/540,761, by Honeywell Aerospace (Inventors: Barriga et al.), filed Aug. 14, 2019.

\* cited by examiner

FRAMED HEAT EXCHANGER CORE DESIGN-FABRICATION

BACKGROUND OF THE INVENTION

The present invention generally relates to heat exchangers and, more particularly, to apparatus and methods for fabricating heat exchangers.

Plate-fin heat exchangers can be brazed to form a core that is a monolithic structure where the sandwiched layers include a top side plate, a hot fin, a tube sheet, a cold fin, and bottom plate. The core may also be welded around a perimeter of the core layers which is referred to as a "butter-pass weld".

As an example, as shown in FIG. 1, a heat exchanger core 10 may include hot fin passages 11 running perpendicular to cold fin passages 12. A butter-pass weld 13 is provided for assembly to a next core.

However, the fabrication of plate-fin heat exchangers can include problems of distortion due to heat treatment, shrinkage during brazing, deformation due to "butter-passing", as well as others.

As can be seen, there is a need for improved apparatus and methods to fabricate plate-fin heat exchangers.

SUMMARY OF THE INVENTION

In one aspect of the present invention, a heat exchanger core comprises a first fin passage; and a first frame surrounding a perimeter of the first fin passage; wherein the first frame includes a plurality of bars integrally configured to be removable from the first frame.

In another aspect of the present invention, a method of making a heat exchanger core comprises surrounding a first passage with a first frame; brazing the core; and after brazing, removing a side bar from the first frame to enable air to flow in or out of the first passage.

In a further aspect of the present invention, a method of making a heat exchanger core comprises surrounding a hot fin passage with a hot frame; surrounding a cold fin passage with a cold frame; brazing the core; after brazing, removing at least one of a support bar and a side bar from at least one of the hot and cold frames; after brazing, leaving a main bar as part of at least one of the hot and cold frames; after brazing, leaving the core devoid of a butter-pass weld.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention provides apparatus and methods of fabricating heat exchangers while eliminating past problems relating to, among other things, shrinkage variation during brazing, deformation of the core from welding (i.e., butter-passing), distortion due to heat treatment, and collapsing of fin passages.

Generally, the present invention enables a heat exchanger core to be stacked quickly and simplifies alignment prior to brazing. The present invention provides the ability to withstand greater force from stacking and brazing, thus reducing gaps between fins and tube sheets, resulting in a stronger braze joint. The heat exchanger core can be easily cut to a consistent size, be ready for next assembly, and eliminates the need for additional welding preparation. In particular, the present invention eliminates the need to build up next assembly faying surfaces created from welding.

The heat exchanger core of the present invention can be fabricated with frame bars manufactured by extruded, machined, forged, 3D printed, casting, stamp or any other method. After brazing, the bars can be contoured by cutting off support material to expose finned passages. The frame bar materials could include aluminum, cooper, titanium, and nickel-based alloys.

Figure 1:
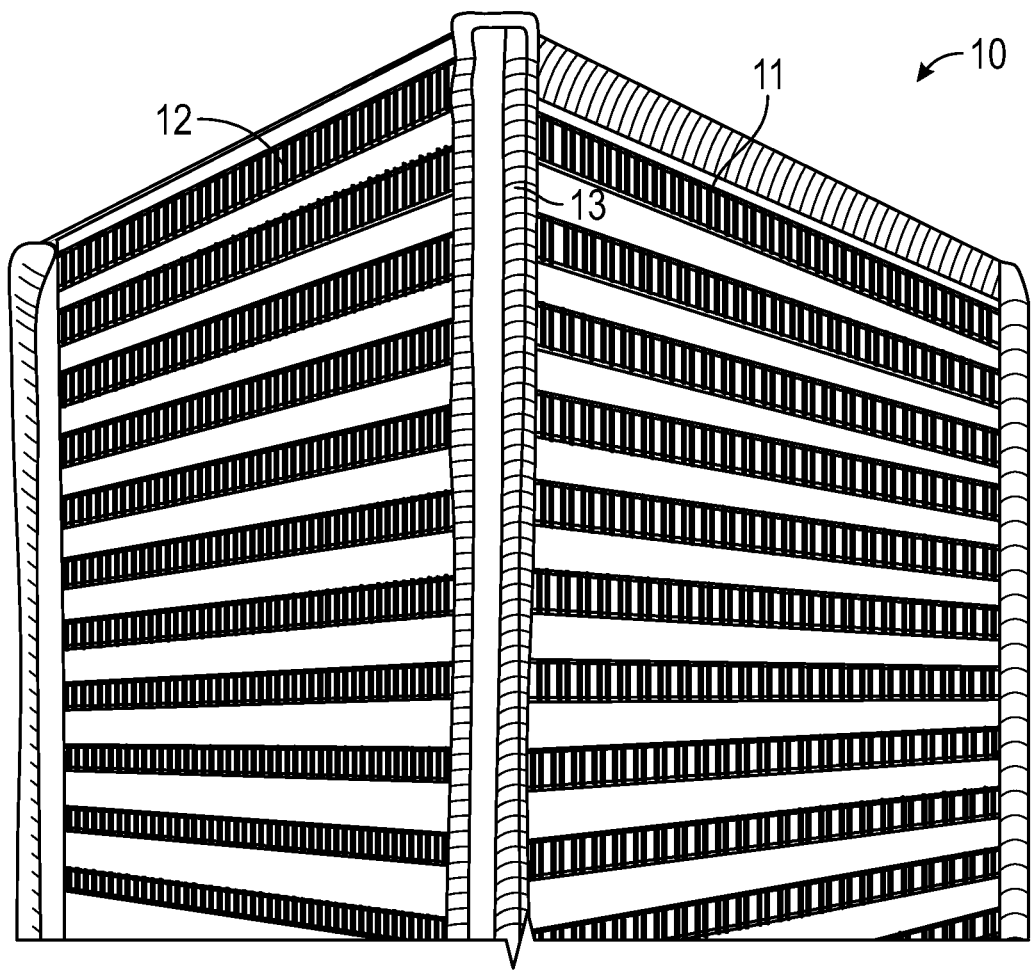
FIG. 1 is an image of a prior air heat exchanger with a butter-pass weld.
Figure 2:
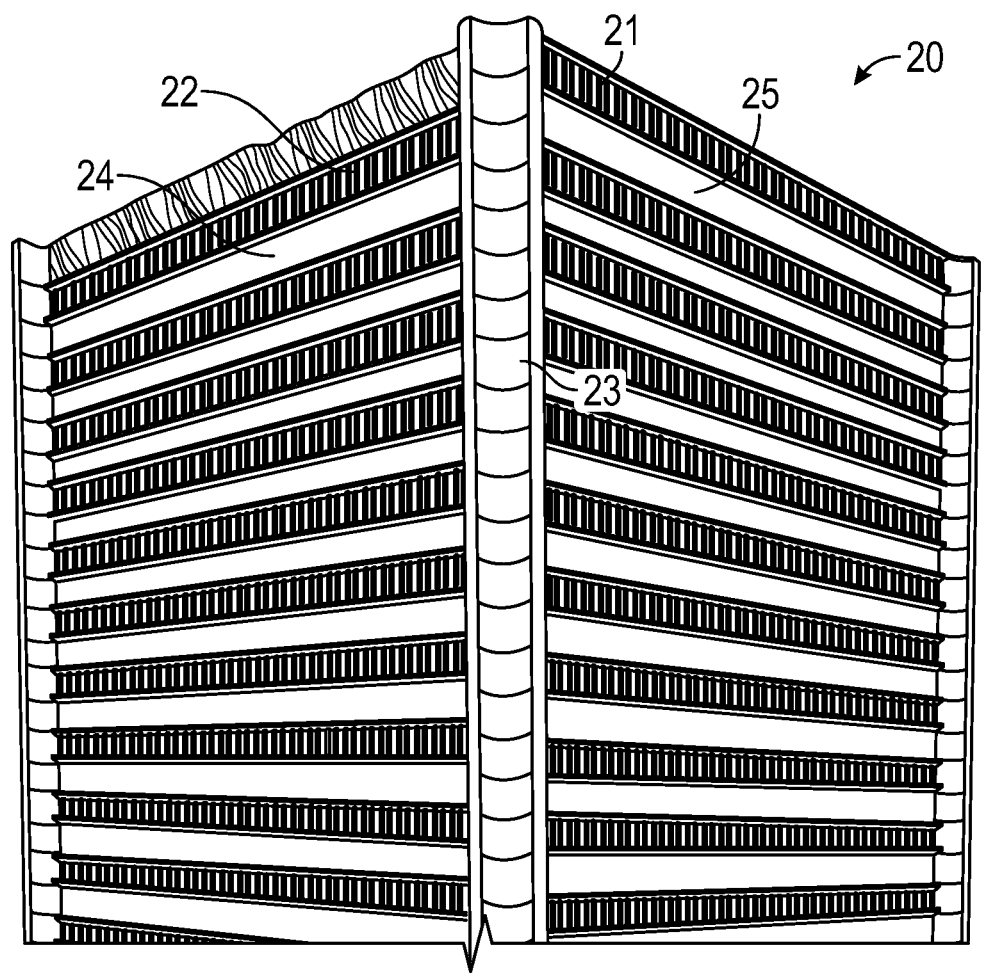
FIG. 2 is an image of a heat exchanger without a butter-pass weld according to an embodiment of the present invention.

In an exemplary embodiment of the present invention, as depicted in FIG. 2, a heat exchanger core 20 may include first or hot fin passages 21 extending perpendicular to second or cold fin passages 22. A first or hot frame 24 may frame the hot fin passages, while a second or cold frame 25 may frame the cold fin passages. In a corner portion 23 of the core 20 where the hot and cold passages meet, it can be seen in FIG. 2 that a butter-pass weld has been eliminated.

Figure 3:
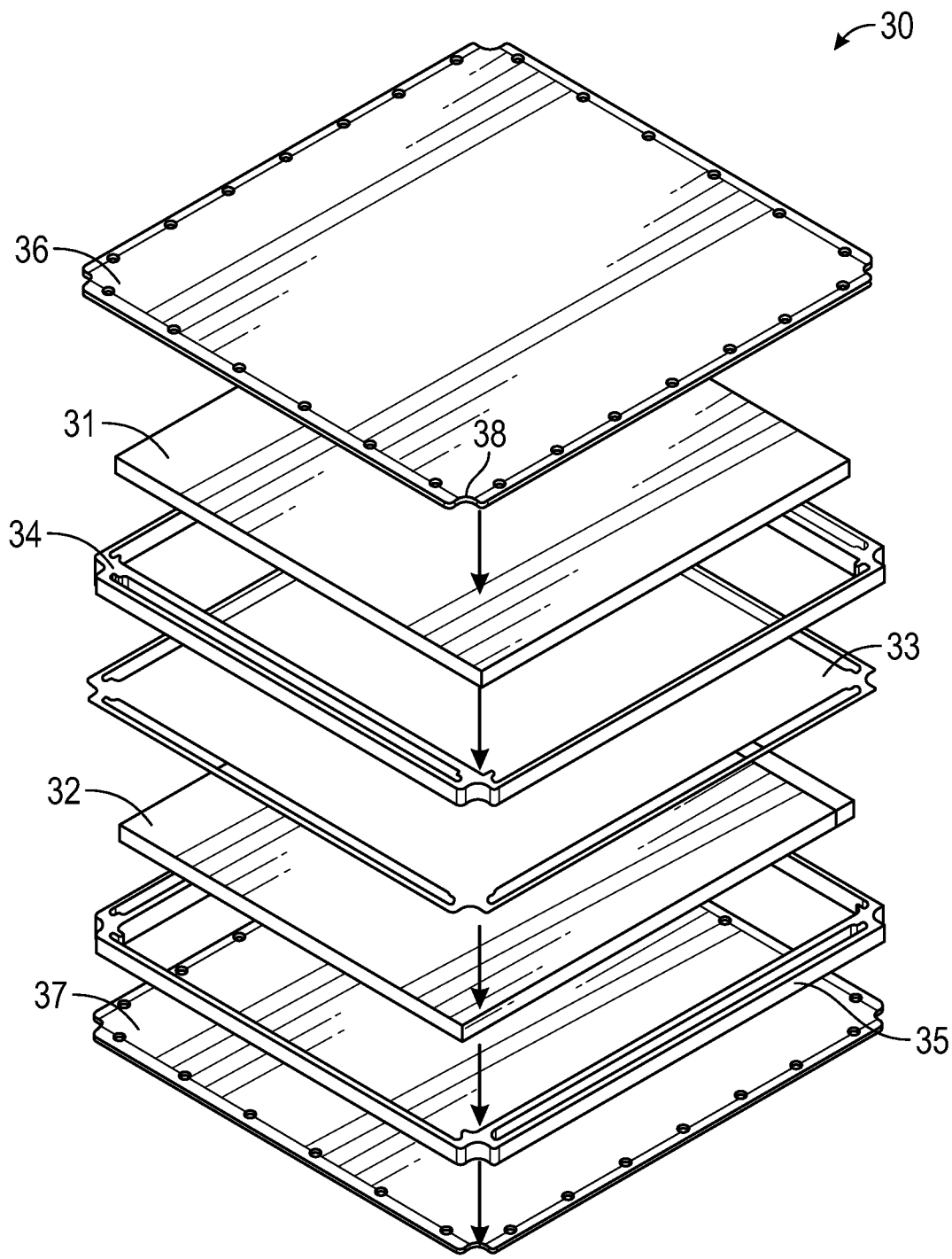
FIG. 3 is an exploded, perspective view of a heat exchanger according to an embodiment of the present invention.

FIG. 3 is an exploded perspective view of a heat exchanger core 30 according to an exemplary embodiment. The heat exchanger core 30 is similar to the heat exchanger core 20 in FIG. 2. Accordingly, reference numbers in FIG. 3 correspond to like reference numbers in FIG. 2.

The heat exchanger core 30 can generally be constructed in a stacked, plate fin design. A first or top side plate 36 may be on one side of the core 30 and a second or bottom side plate 37 may be on an opposite side of the core 30. Between the first and second side plates 36, 37, first or hot fin passages 31 may run perpendicular to second or cold fin passages 32. A tube sheet 33 can be interposed between the first and second fin passages 31, 32. A perimeter configuration of the tube sheet 33 can match a combined perimeter configuration of both first and second frames described below.

In embodiments, a first or hot frame 34 may frame or surround a perimeter of the first or hot passages 31. A second or cold frame 35, similar in design and construction to the first frame 34, may frame or surround a perimeter of the second or cold passages 32. A corner portion 38 of the core 30 may extend from a corner of the top plate 36, through the frames 34, 35, and to a corner of the bottom plate 37. The corner portion 38 may correspond to the corner portion 23 in FIG. 2.

Although FIG. 3 shows only one hot passage and one cold passage for purposes of illustration, it will be understood by those skilled in the art that multiple hot passages, multiple cold passages, multiple hot frames, and multiple cold frames can be employed.

Figure 4:
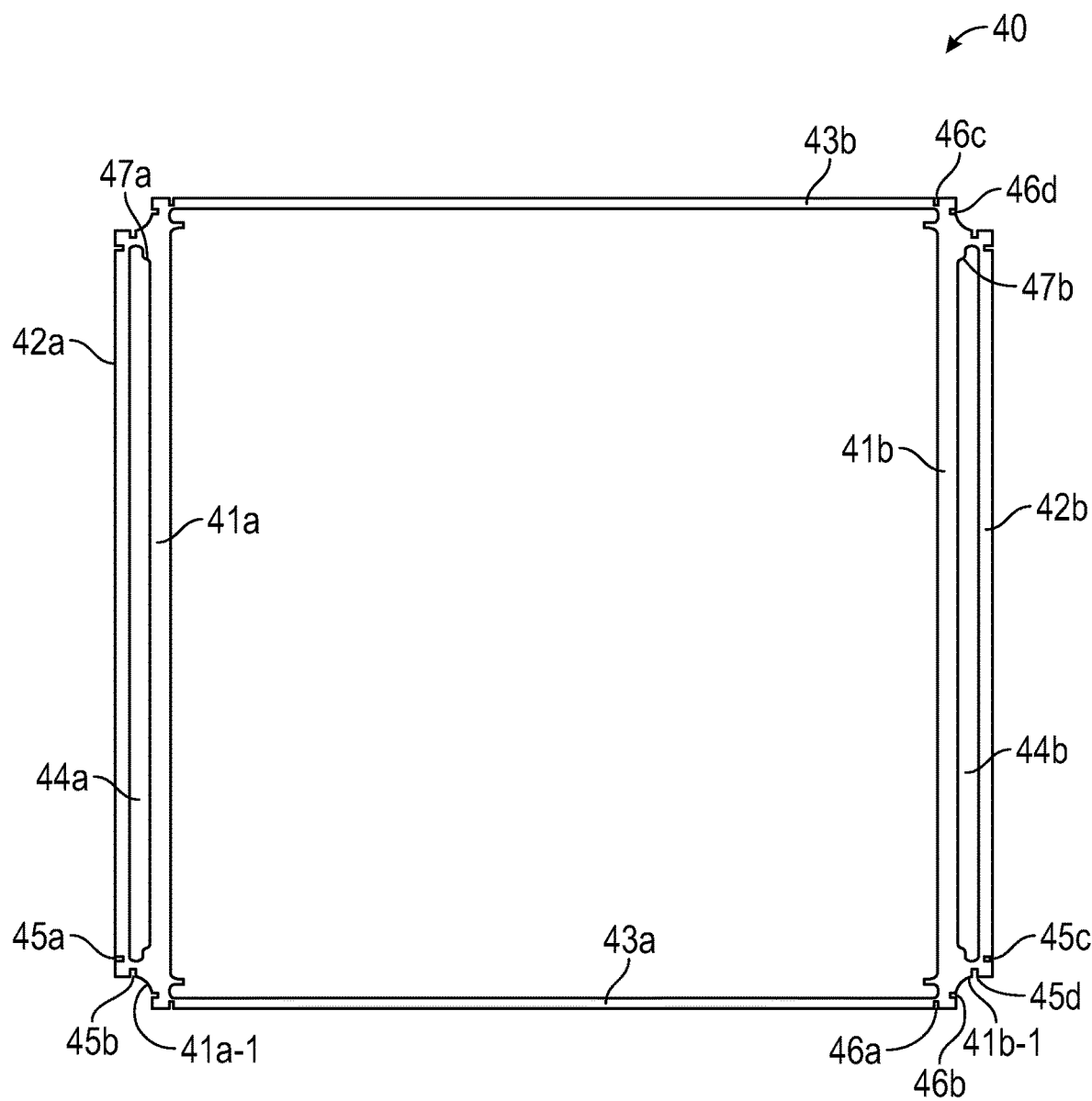
FIG. 4 is a top view of a framed bar that can be employed in a heat exchanger according to an embodiment of the present invention.

FIG. 4 is a top plan view of a frame 40 according to an exemplary embodiment of the present invention. The frame 40 may be used, for example as one or both of the hot and cold frames 34, 35 in FIG. 3.

In embodiments, the frame 40 may include, at a perimeter thereof, a pair of main bars 41a, b which are on a pair opposite sides of the perimeter. In embodiments, one or both of the main bars 41a, b are configured to permanently remain as part of the frame 40 and, thus, not removable from the frame 40. One or both of the main bars 41a, b can have a respective corner portion 41a-1, b-1. The corner portions 41a-1, b-1 may be disposed to correspond in location and configuration to the corner portion 38 depicted in FIG. 3.

The frame 40, according to embodiments, may further include a pair of support bars 42a, b that are respectively paired with the main bars 41a, b. So paired, the support bars 42a, b may extend parallel to the main bars 41a, b. The support bars 42a, b may also be spaced apart from the main bars 41a, b whereby the support bars 42a, b can be disposed outside of the main bars 41a, b. In other words, the support bars 42a, b are further from a center area of the frame 40 than the main bars 41a, b.

With the support bars 42a, b spaced apart from the main bars 41a, b, a pair of slots 44a, b can be respectively formed between the support bars and the main bars. As described below, the slots 44a, b can provide for air passage.

According to embodiments, the frame 40 may further include a pair of side bars 43a, b disposed on another pair of opposite sides of the perimeter. In other words, the side bars 43a, b form one pair of opposite sides of the frame perimeter, and the main bars/support bars from another pair of opposite sides of the frame perimeter.

In embodiments, the frame 40 may be provided with one or more groove guides. In embodiments, a groove guide 45a, or 45b may be provided at one or both distal ends of the support bar 42a. Likewise, a groove guide 45c, or 45d may be provided at one or both distal ends of the support bar 42b. Similarly, groove guides 46a, b, c, d may be provided at one or both ends of the side bars 43a, b.

In embodiments, the frame 40 may be provided with one or more support tabs for alignment and extra support. In embodiments, a support tab 47a may be provided at one or both distal ends of the main bar 41a. Likewise, a support tab 47b may be provided at one or both distal ends of the main bar 41b.

As described below, one or more of the groove guides 45a, b, c, d and 46a, b, c, d can be used to guide a cut and then discard one or more of the support bars 42a, b and side bars 43a, b. Accordingly, one or more of the support bars 42a, b and/or one or more of the side bars 43a, b can be configured to be removable from the frame 40.

Figure 5:
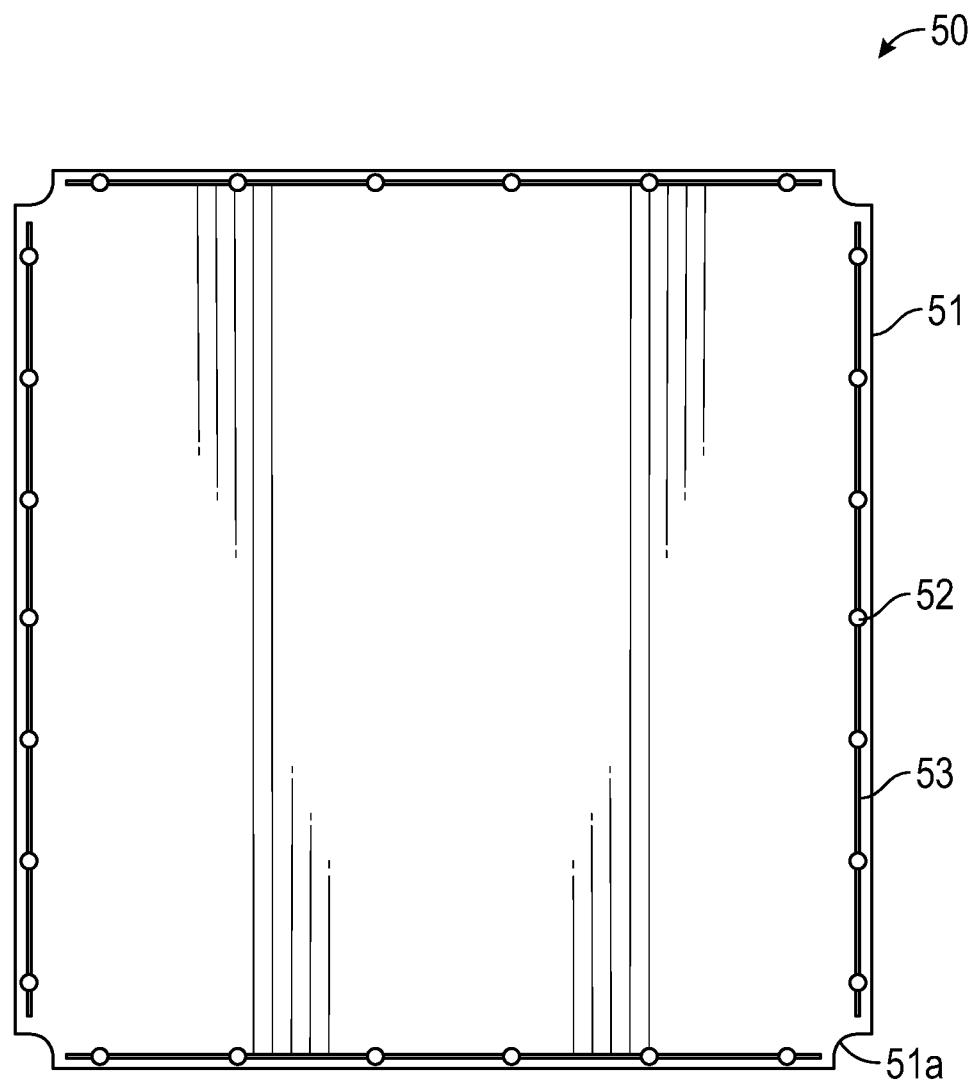
FIG. 5 is a top view of a side plate that can be employed in a heat exchanger according to an embodiment of the present invention.

FIG. 5 is a top plan view of a side plate 50. The side plate 50 may be used, for example, as either one or both of a top plate 36 or bottom plate 37 as shown in FIG. 3.

In embodiments, the side plate 50 may include a side or perimeter edge 51. At one or all corners thereof may be a corner edge 51a that may correspond in location and configuration to the corner portion 38 in FIG. 3.

The side plate 50 may further include a cut line 53 that extends along all or a portion of the perimeter edge 51. The cut line 53 may correspond to the location of one or more of the slots 44a, b in the frame 40 in FIG. 4. Along all or a portion of the cut line 53 may be one or more holes 52 that are disposed on the cut line 53. Accordingly, the one or more holes 52 may correspond to the location of one or more of the slots 44a, b in the frame 40 in FIG. 4.

As described below, the holes 52 may be used to evacuate air during brazing and/or heat treatment of the core. The cut line 53 may be used to guide cutting of the side plate 50 after brazing.

Figure 6A:
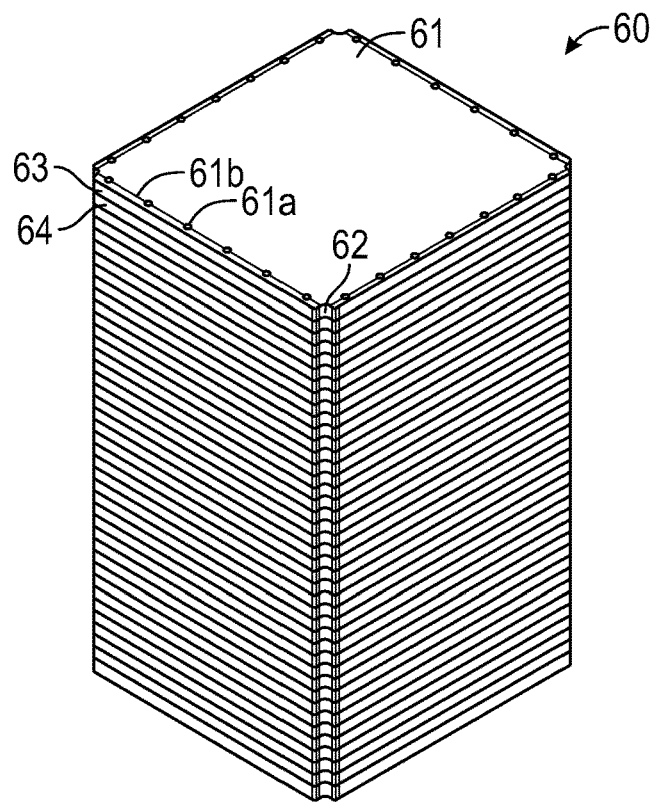
FIG. 6A is a perspective view of a heat exchanger before machining according to an embodiment of the present invention.

FIG. 6A is a perspective view of a heat exchanger core 60 before machining/cutting according to an embodiment of the present invention. In this exemplary depiction, the core 60 includes a top plate 61, holes 61a, cut line 61b, corner portion 62, and alternating hot frames 63 and cold frames 64. All of these features can be similar to that depicted in FIGS. 3-5.

In the configuration shown in FIG. 6A, the core 60 may undergo brazing. During brazing, air within the core 60 may be evacuated through the slots (not shown) in the frames 63, 64 and out of the core 60 via the holes 61a.

Figure 6B:
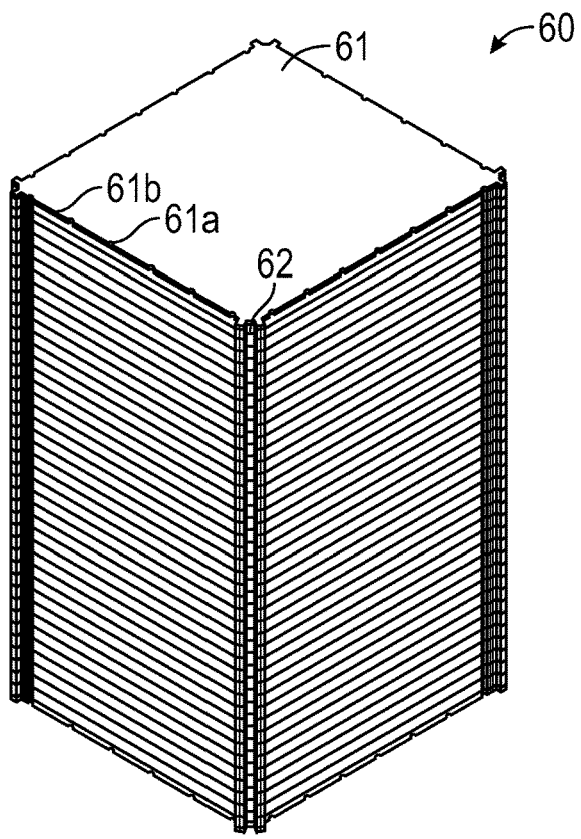
FIG. 6B is a perspective view of a heat exchanger after machining according to an embodiment of the present invention.

FIG. 6B is a perspective view of the heat exchanger core 60 after brazing and subsequent machining/cutting. In this exemplary depiction, the plate 61 has been cut all along the cut line 61b and also through all of the holes 61a, as well as throughout groove guides 45a, b, c, d and 46a, b, c, d. Thus, a portion of the plate 61 has been removed and discarded. The method of cutting can be of any conventional method.

Figure 7:
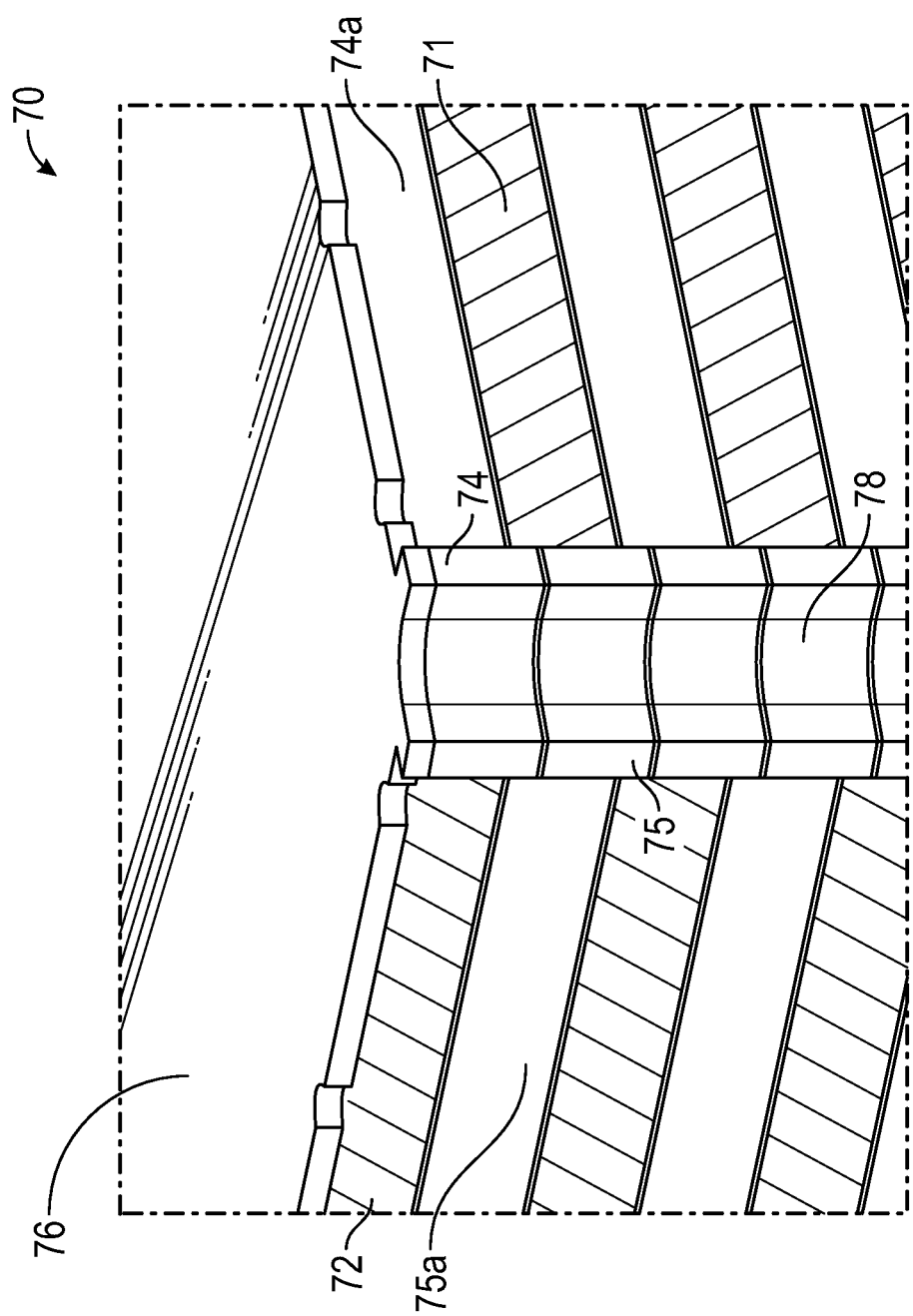
FIG. 7 is a close up, perspective view of a corner of a heat exchanger according to an embodiment of the present invention.

FIG. 7 is a close up, perspective view of a heat exchanger core 70 according to an exemplary embodiment. A first or cold fin passage 72 is shown with a side bar and support bar cut away from its respective cold frame 74. The cold fin passage 72 is open to air entering or existing the passage 72 because of the side bar removal. However, the main bar 74a remains as part of the cold frame 74 for structural support.

Likewise, a second or hot fin passage 71 is shown with a side bar cut away from a hot frame 75. The hot fin passage 71 is open to air entering or existing the passage 71 because of the side bar removal. However, the main bar 75a remains as part of the hot frame 75 for structural support.

In embodiments, a corner portion 78 extends from a top plate 76 and through the cold and hot frames 74, 75. However, the corner portion 78 is devoid of a butter-pass weld yet ready for the next assembly.

From the foregoing, it can be seen that an exemplary method of the present invention can include surrounding a hot fin passage with a hot frame that has one or more removable bars. The method can further include surrounding a cold fin passage with a cold frame that has one or more removable bars. With side plates sandwiching the hot fin passage, hot frame, slotted tube sheet, cold fin passage, and cold frame, the core can be brazed.

During brazing, according to the exemplary method, one or more slots in the hot and cold frames may allow for the evacuation of air in the core. Holes in the side plates may assist in that evacuation.

After brazing, the exemplary method may include removing/cutting one or more of the removable bars from one or both of the hot and cold frames. The removable bars can include a pair of opposed support bars and a pair of opposed side bars. Cutting can be along groove guides in the removable bars. A main bar is left as part of at least one of the hot and cold frames. The exemplary method may additionally include cutting away a portion of the side plates after brazing.

Also after brazing, the core is left devoid of a butter-pass weld.

It should be understood, of course, that the foregoing relates to exemplary embodiments of the invention and that modifications may be made without departing from the spirit and scope of the invention as set forth in the following claims.

We claim:

1. A heat exchanger core comprising:
a first side plate;
a second side plate;
a first fin passage located between the first side plate and the second side plate; and
a first frame surrounding an entire outer perimeter of the first fin passage between the first side plate and the second side plate,
wherein the first frame includes a pair of opposed main bars and a pair of opposed side bars, wherein the pair of opposed side bars is configured to be removable from the first frame such that, when the pair of opposed side bars is removed from the first frame, a first fin passage opening and a second fin passage opening are defined between the first side plate and the second side plate with the pair of opposed main bars of the first frame extending from the first fin passage opening to the second fin passage opening, and
wherein the first frame includes a plurality of grooves guides that define respective locations to cut the first frame to remove the pair of opposed side bars from the first frame.

2. The heat exchanger core of claim 1, wherein the first frame further includes a pair of opposed support bars with respective support bars being adjacent to respective main bars of the pair of opposed main bars, wherein the pair of opposed support bars is configured to be removable from the first frame, and wherein the first frame includes a plurality of grooves guides that define respective locations to cut the first frame to remove the support bars from the first frame.

3. The heat exchanger core of claim 1, wherein the first frame includes a corner portion devoid of a butter-pass weld.

4. The heat exchanger core of claim 1, further including:
a tube sheet;
a second fin passage located between the second side plate and the tube sheet; and
a second frame surrounding an entire outer perimeter of the second fin passage between the second side plate and the tube sheet,
wherein the second frame includes another pair of opposed main bars and another pair of opposed side bars, wherein the another pair of opposed side bars is configured to be removable from the second frame such that, when the another pair of opposed side bars is removed from the second frame, a third fin passage opening and a fourth fin passage opening are defined between the second side plate and the tube sheet with the another pair of opposed main bars of the second frame extending from the third fin passage opening to the fourth fin passage opening.

5. The heat exchanger core of claim 1, wherein the first side plate includes a cut line at a perimeter of the first side plate.

6. The heat exchanger core of claim 1, wherein the first side plate includes holes at a perimeter of the first side plate.

7. The heat exchanger core of claim 2, wherein a gap is defined between the respective main bar and the respective support bar.

8. The heat exchanger core of claim 7, wherein the first side plate includes a cut line at a perimeter of the first side plate, and wherein the cut line is aligned with the gap between the respective main bar and the respective support bar.

9. The heat exchanger core of claim 8, wherein the cut line is defined at least in part by a plurality of holes formed in the first side plate.

10. The heat exchanger core of claim 1, wherein the first frame includes a plurality of grooves guides that define respective locations to cut the first frame to remove the pair of opposed side bars from the first frame.

11. A heat exchange core comprising:
a first side plate;
a second side plate;
a tube sheet between the first side plate and the second side plate;
a first fin passage located between the first side plate and the tube sheet;
a first frame surrounding a first entire perimeter of the first fin passage between the first side plate and the tube sheet;
a second fin passage between the second side plate and the tube sheet; and
a second frame surrounding a second entire perimeter of the second fin passage between the second side plate and the tube sheet,
wherein the first frame includes a first pair of opposed main bars and a first pair of opposed side bars, wherein the first frame includes a first plurality of grooves guides that define respective first locations to cut the first frame to remove the first pair of opposed side bars from the first frame, wherein, when the first frame is cut at the respective first locations, a first fin passage opening and a second fin passage opening are defined between the first side plate and the tube sheet with the first pair of opposed main bars extending from the first fin passage opening to the second fin passage opening, and
wherein the second frame includes a second pair of opposed main bars and a second pair of opposed side bars, wherein the second frame includes a second plurality of grooves guides that define respective second locations to cut the second frame to remove the second pair of opposed side bars from the second frame, wherein, when the second frame is cut at the respective second locations, a third fin passage opening and a fourth fin passage opening are defined between the second side plate and the tube sheet with the second pair of opposed main bars extending from the third fin passage opening to the fourth fin passage opening.

* * * * *